United States Patent Office 2,945,652
Patented July 19, 1960

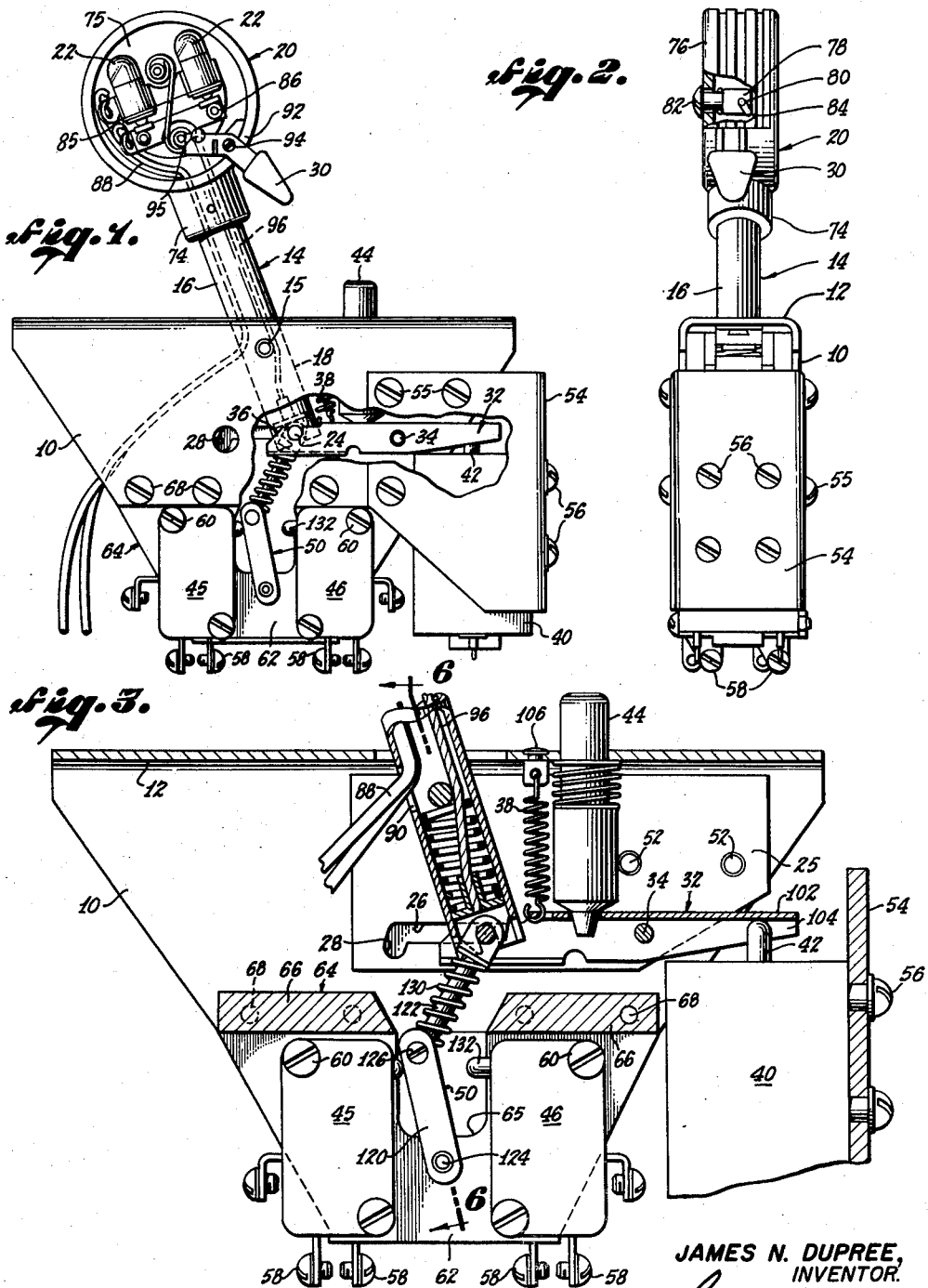

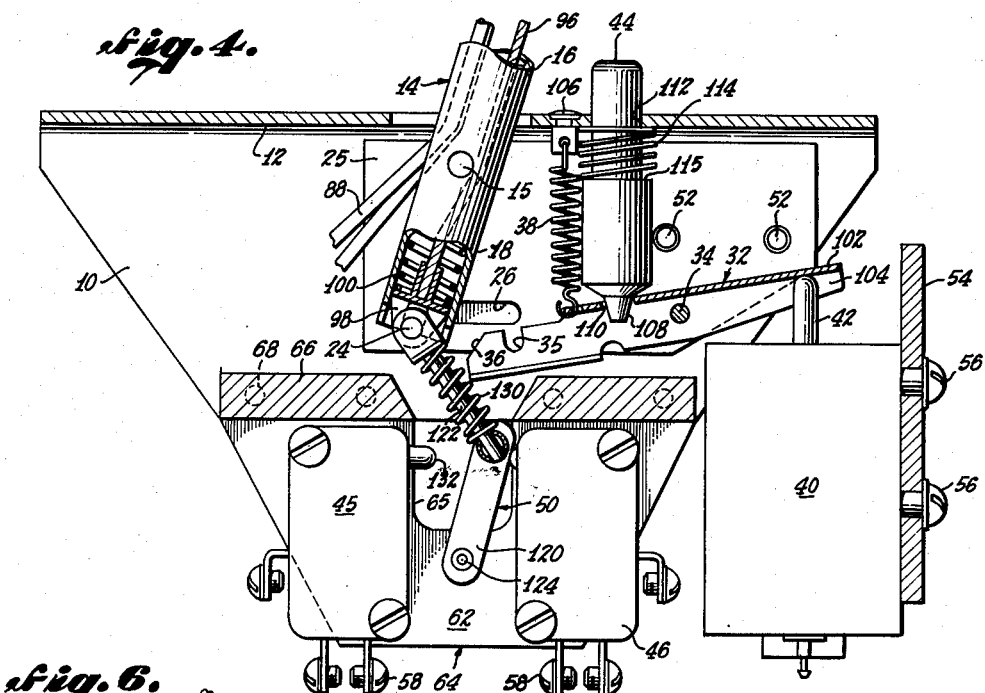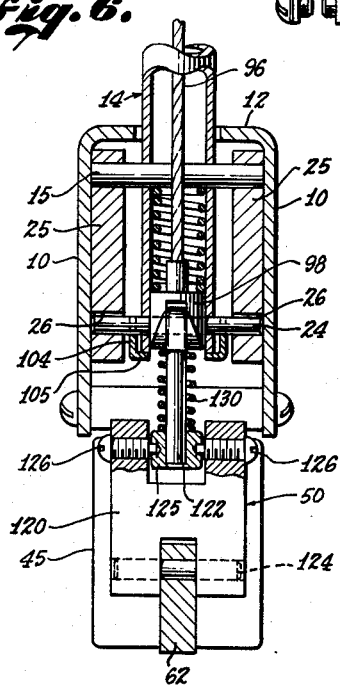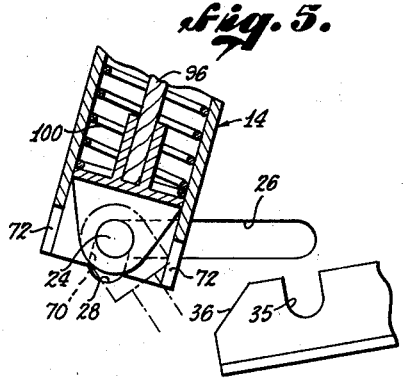

2,945,652

LANDING GEAR CONTROL INCORPORATING SAFEGUARDS AGAINST ERRONEOUS OPERATION

James N. Dupree, Hollywood, Calif., assignor to California Plasteck, Inc., Los Angeles, Calif., a corporation Filed Nov. 22, 1955, Ser. No. 548,319

2 Claims. (Cl. 244—102)

This invention relates to a manually operable control means for incorporation in the landing gear control system of an aircraft, the primary purpose of the invention being to provide safeguards against erroneous operation of a landing gear control system.

One safeguard provided by the invention prevents inadvertent extension of the landing gear during flight, such a safeguard being of utmost importance for aircraft flying at supersonic speeds. For this purpose the invention provides an automatic latch to engage and hold the manually operable landing gear control at its "up" position. This latch may be manually released to permit the landing gear to be lowered for a landing but the manipulation required for such manual release provides an adequate safeguard against absent-minded lowering of the landing gear.

Another safeguard provided by the invention has for its purpose prevention of inadvertent retraction of the landing gear while the aircraft is on the ground. To this end the invention provides means to lock the manually operable control means in its "down" position, which locking means is effective whenever the weight of the aircraft is imposed on the landing gear. In the preferred practice of the invention, this locking means is biased to its locking position so that it is normally effective for its purpose and electrically actuated means is provided to make the locking means ineffective in response to the lessening of the weight of the aircraft on the landing gear. This arrangement is "fail-safe" in the sense that failure of the electrically actuated means does not prevent the normal safety function of the locking means.

The preferred practice of the invention further incorporates suitable lamp means to indicate that the landing gear is in the process of being extended or retracted. In this regard a feature of the invention is the incorporation of a lamp means into the handle structure of the manually operable control and a further feature of the preferred practice of the invention is the provision of a snap-acting toggle linkage operatively connected to the manually operable control, the snap-acting toggle linkage serving to actuate switch means for controlling the lamp circuit.

A special feature of the preferred practice of the invention is that the mechanism for all of the foregoing functions is incorporated in a compact control unit. Preferably the unit includes switches for controlling the extension and retraction of the landing gear, these control switches being operated by the previously mentioned snap-action toggle linkage. The unit may be readily mounted in an aircraft and then may be made operative for its purpose by merely connecting the electrical terminals of the unit to the wiring of the landing gear control system.

The features and advantages of the invention may be readily understood from the following detailed description taken with the accompanying drawings.

In the drawings, which are to be regarded as merely illustrative:

Figure 1 is a side elevational view showing the presently preferred practice of the invention embodied in a compact control unit, the control handle being at its "down" position, which position is taken when the aircraft is on the ground;

Figure 2 is an end elevation of the unit;

Figure 3 is a fragmentary longitudinal sectional view of the unit showing the control lever in the same "down" position with the control lever locked against inadvertent operation;

Figure 4 is a view showing the control lever in its "up" position, the aircraft being airborne;

Figure 5 is an enlarged fragment of Figure 4 showing the latch for the control lever in its release position in preparation for movement of the control lever from its "up" position to its "down" position; and Figure 6 is a transverse section taken along the angular line 6—6 of Figure 3.

*General arrangement*

The control assembly shown in the drawing is a compact unit, the moving parts of which are mounted in a suitable support structure or chassis. In the construction shown, the chassis comprises a single metal plate bent to the configuration of an inverted U to provide two parallel side walls 10 and a top wall 12, the chassis being open at both ends and at the bottom.

The principal components of the landing gear control unit include: a manually operable landing gear control member in the form of a lever, generally designated 14, mounted on a suitable pivot 15, the lever having an upwardly extending handle-arm 16 and a downwardly extending operating arm 18; a handle, generally designated 20, on the lever 14 (Figures 1 and 2) adapted for illumination by a pair of lamps 22 (Figure 1) enclosed therein; a yieldable latch member in the form of a cross pin 24 (Figure 6) mounted in the lower end of the lever 14, this cross pin being retractable upward; a pair of guide plates 25 (Figures 3 and 6) mounted on the two chassis side walls 10, respectively, on opposite sides of the control lever 14, each of these guide plates having a longitudinal guide slot 26 for sliding engagement by the cross pin 24 and each of these guide slots having a recess 28 at its forward end for engagement by the cross pin at the "up" position of the control lever 14; a finger piece 30 on the handle 20 of the lever 14 for manual retraction of the cross pin 24 out of the latching recesses 28; a locking member in the form of a locking lever 32 mounted on a pivot 34, which locking lever has a locking recess 35 (Figures 5 and 6) for engagement by the cross pin 24 and also has an inclined cam surface 36 for sliding engagement by the cross pin; a spring 38 (Figure 3) for urging the locking lever 32 towards its effective or locking position; a solenoid 40 having an armature or plunger 42 to rock the locking lever 32 to its release position, this solenoid being responsive in a well known manner to the weight of the aircraft imposed on the landing gear and being adapted to rock the locking lever 32 to its release position in response to removal of the weight of the aircraft from the landing gear; an emergency means in the form of a manually operable plunger 44 to rock the locking lever 32 to its release position in the event that the solenoid 40 fails to function; a plurality of switches comprising a forward pair of switches 45 (Figures 3 and 6) and a rearward pair of switches 46; and a snap-acting toggle linkage, generally designated 50, that is operated by the lower arm of the control lever 14 for the purpose of actuating the switches 45 and 46.

Figures 1 and 3 show the positions of the various parts when the control lever 14 is in its "down" position and the aircraft is supported by its landing gear. It will be noted that the latching cross pin 24 is at the ends of the two guide slots 26 away from the forward latching recesses 28, and it will be further noted that the cross pin is engaged by the locking recess 35 of the locking lever 32. The locking lever 32 is held in its effective position by a spring 38 in the absence of energization of the solenoid 40. At this time the snap-acting toggle linkage 50 presses against the forward pair of switches 45.

When the aircraft takes off and becomes airborne, the solenoid 40 is automatically actuated in response to the removal of the weight of the aircraft from the landing gear. Energization of the solenoid 40 causes the plunger or armature 42 to push upward for rotation of the locking lever 32 to its release position as shown in Figure 4. Energization of the solenoid 40 releases the control lever 14 to permit the control lever to be swung manually to its "up" position shown in Figure 4. If for any reason the solenoid 40 fails to function, the pilot depresses the manually operable plunger 44 to rock the locking lever 32 to its release position.

Shifting the control lever 14 from its "down" position to its "up" position causes the snap-acting toggle linkage 50 to snap to the position shown in Figure 4 for actuation of the rearward pair of switches 46. One of these switches may close the usual actuating circuit for causing the landing gear to be retracted. The two lamps 22 in the handle 20 are energized in a well known manner by the landing gear control system during the interval of time required for complete retraction of the landing gear and then are de-energized. Thus the pilot is informed as to whether or not the operation of retracting the landing gear is completed.

When the pilot swings the control lever 14 to this "up" position the latching cross pin 24 drops into the two forward latching recesses 28 in the guide slots 26 in the two guide plates 25 to prevent inadvertent movement of the operating lever out of this position.

In preparation for landing the aircraft, the pilot grasps the handle 20 of the control lever 14 and manipulates the finger piece 30 to retract the latching cross pin 24 out of the forward latching recesses 28, as best shown in Figure 5, thus releasing the operating lever for movement to its "down" position. The pilot then swings the operating lever 14 to its opposite "down" position with consequent snap action of the toggle linkage 50 to the position shown in Figures 1 and 3 for actuation of the forward pair of switches 45. One of these switches causes the landing gear to be extended and again the lamps 22 in the handle 20 are energized for the duration of the extension operation. At this time the solenoid 40 is energized but as soon as the landing gear touches the ground and takes on the full weight of the aircraft, the solenoid 40 is automatically deenergized to permit the spring 38 to rock the locking lever 32 into engagement with the cross pin 24 as shown in Figures 1 and 3.

*Details of construction*

The two guide plates 25 are mounted on the respective side walls 10 of the chassis by suitable rivets 52 and a U-shaped bracket 54 carrying the solenoid 40 is attached to the side walls by additional screws 55 (Figure 1), the solenoid being secured to the bracket by screws 56.

The two pairs of switches 45 and 46, which have suitable terminal screws 58 for connection with wiring, are mounted by screws 60 on the central vertical longitudinal web 62 of a hanger that is generally designated by numeral 64. The web 62 of the hanger is U-shaped in side elevation, being recessed or cut away as indicated at 65 (Figure 3) to provide clearance for the toggle linkage 50. The upwardly extending legs of the web 62 are integral with heavy horizontal portions 66 of the hanger that span the space between the chassis side walls 10 and are attached to the side walls by suitable screws 68.

The shank of the control lever 14 is tubular and is provided with a diametrical pair of slots 70 (Figure 5) at its lower end to receive the cross pin 24 and has a second pair of diametrical slots 72 to provide clearance for the toggle linkage 50. The handle 20 which is mounted on the lever shank by a sleeve portion 74 includes a disc 75 on which a cup-shaped cover 76 of translucent plastic material is removably mounted in a suitable manner. In this instance, the cover 76 is removably mounted in a well known manner by means of a rotary stud 78 in cooperation with a spring wire member 80. The rotary stud 78 which is carried by the cover 76 has a head 82 that is slotted for rotation by a screw driver and has a helical slot 84 that engages the spring wire member 80 with a cam action to flex the wire and thereby hold the cover 76 securely in place.

The two lamp bulbs 22 inside the hollow handle 20 are removably supported by an insulated spring metal bracket 85 on the disc 75 and a separate insulated conductor 86 is also positioned on the disc for abutment by the bottom contacts of the two lamps. A pair of wires 88 connected respectively to the metal bracket 85 and the conductor 86 extend down inside the shank of the control lever 14 and out through an aperture 90 (Figure 3) for connection to appropriate circuits of the landing gear control system.

The previously mentioned finger piece 30 for manually retracting the cross pin 24 may be in the form of a lever extending through a slot 92 (Figure 1) of the handle 20, the lever being mounted on a suitable pivot screw 94. The inner arm of the finger piece is of forked construction to seat a fitting 95 at the upper end of a cable 96. This cable 96 is connected at its lower end to a clevis member 98 that is mounted centrally on the scross pin 24. A suitable coiled spring 100 in the shank of the control lever 14 is in compression between the clevis member 98 and the previously mentioned pivot pin 15 and serves to continuously urge the cross pin 24 downward against the guide surfaces provided by the slots 26 of the two guide plates 25. It is apparent that downward pressure on the finger piece 30 to cause clockwise rotation thereof as viewed in Figure 1 may serve to lift the cross pin 24 out of the terminal latching recesses 28 of the two guide plates 25.

The locking lever 32 may be a sheet metal member of inverted channel configuration having an upper longitudinal web 102 and two laterally spaced downwardly extending side flanges 104. These side flanges 104 extend forward beyond the end of the web 102 to provide a laterally spaced pair of the locking recesses 35 as well as a laterally spaced pair of the inclined cam surfaces 36. Preferably the forwardly extending portions of the side flanges 104 are reinforced by inwardly turned flanges 105 (Figure 6) along their bottom edges. The previously mentioned spring 38 is connected at its lower end to the web 102 of the locking lever and is connected at its upper end to the web 12 of the chassis by means of a stud 106.

The previously mentioned manually operable plunger 44 has a reduced conical nose 108 at its lower end that seats in a corresponding aperture 110 in the locking lever web 102. The plunger 44 extends through an aperture 112 in the chassis wall 12 and preferably is provided with a coiled spring 114 in compression between the chassis wall and a radial shoulder 115 of the plunger. The spring 114 is a relatively light spring that serves merely to keep the plunger seated in the locking lever aperture 110, the spring exerting substantially less force than the adjacent spring 38.

The toggle linkage 50 for actuating the switches 45 and 46 in response to operation of the control lever 14 may comprise a lower link 120 that is H-shaped as viewed in Figure 6 and an upper link 122 that has a rod-like shank and is pivotally mounted at its upper end on the cross pin 24. The lower end of the lower link 120 is pivotally connected to the web 62 of the hanger 64 by a suitable pivot pin 124 and the upper end of this link is pivotally connected to a small collar 125 by a pair of diametrically positioned screws 126. This collar 125 is slidingly mounted on the shank of the upper link 122.

To provide the required snap action, a suitable coiled spring 130 surrounds the upper link 122 in compression against the collar 125. Thus when movement of the control lever 14 swings the upper link 122 "past center," spring 130 causes the toggle linkage to reverse with a snap-action. In this manner the toggle linkage 50 exerts actuating pressure against the operating plungers 132 of the switches 45 and 46.

My description in specific detail of the presently preferred embodiment of the invention will suggest various changes, substitutions and departures from my disclosure that properly lie within the spirit and scope of the appended claims.

I claim:

1. A manual control unit for incorporation in a landing gear control system of an aircraft comprising: a support structure; a manual control lever pivotally mounted on said support structure for movement to a down position to lower the landing gear and to an up position to raise the landing gear; two cooperative means, one on said lever and one on said support structure to latch said lever at its up position; manually operable means on the lever to release said latch means to permit the control lever to be moved to its down position; locking means pivotally mounted on said support structure for movement between a release position and a locking position to engage and lock said lever automatically at its down position; spring means interconnecting said locking means and said support structure to urge the locking means to its locking position; a solenoid carried by said support structure to rotate said locking means out of its locking position in opposition to said yielding means; means to rotate said locking means out of its locking position in the absence of energization of said solenoid; a plurality of control switches; and means to actuate said switches in response to movement of the control lever between its up and down positions.

2. A unit as set forth in claim 1 which includes lamp means on said lever controlled by at least one of said switches to indicate when the landing gear is in movement between its lower and raised positions.

References Cited in the file of this patent

UNITED STATES PATENTS

| | | |
|---|---|---|
| 1,694,220 | Jenkins | Dec. 4, 1928 |
| 2,101,611 | Dowty | Dec. 7, 1937 |
| 2,406,524 | Ashton et al. | Aug. 27, 1946 |
| 2,417,691 | Kelley et al. | Mar. 18, 1947 |
| 2,446,700 | Giles et al. | Aug. 10, 1948 |
| 2,454,485 | Snell | Nov. 23, 1948 |
| 2,473,792 | Fontaine | June 21, 1949 |
| 2,755,041 | Lewis | July 17, 1956 |

FOREIGN PATENTS

| | | |
|---|---|---|
| 539,128 | Great Britain | Aug. 28, 1941 |
| 547,282 | Great Britain | Aug. 20, 1942 |
| 991,748 | France | June 27, 1951 |